US011898518B2

(12) United States Patent
Moniz et al.

(10) Patent No.: US 11,898,518 B2
(45) Date of Patent: Feb. 13, 2024

(54) AIRCRAFT AND DIRECT DRIVE ENGINE UNDER WING INSTALLATION

(71) Applicant: General Electric Company, Schenectady, NY (US)

(72) Inventors: Thomas Ory Moniz, Loveland, OH (US); Randy M. Vondrell, Cincinnati, OH (US); Jeffrey Donald Clements, Mason, OH (US); Brandon Wayne Miller, Liberty Township, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 17/892,549

(22) Filed: Aug. 22, 2022

(65) Prior Publication Data

US 2022/0403799 A1 Dec. 22, 2022

Related U.S. Application Data

(62) Division of application No. 15/439,167, filed on Feb. 22, 2017, now Pat. No. 11,421,627.

(51) Int. Cl.
*F02K 3/075* (2006.01)
*F02K 3/06* (2006.01)
(Continued)

(52) U.S. Cl.
CPC ............. *F02K 3/075* (2013.01); *B64D 27/12* (2013.01); *B64D 29/02* (2013.01); *F01D 21/045* (2013.01);
(Continued)

(58) Field of Classification Search
None
See application file for complete search history.

(56) References Cited

U.S. PATENT DOCUMENTS 2,999,667 A * 9/1961 Morley ................. F01D 21/045
 415/196
3,747,343 A 7/1973 Rosen
(Continued)

FOREIGN PATENT DOCUMENTS

WO WO2013/106223 A1 7/2013

OTHER PUBLICATIONS

Gunston (Ed.), Jane's Aero-Engines [2005], Jane's Information Group Limited, Issue 17, pp. 610-611 (Year: 2005).*

(Continued)

*Primary Examiner* — Jason H Duger
(74) *Attorney, Agent, or Firm* — Dority & Manning, P.A.

(57) ABSTRACT

The present disclosure is directed to a gas turbine engine defining a radial direction, a longitudinal direction, and a circumferential direction, an upstream end and a downstream end along the longitudinal direction, and an axial centerline extended along the longitudinal direction. The gas turbine engine includes a fan assembly including a plurality of fan blades rotatably coupled to a fan rotor in which the fan blades define a maximum fan diameter and a fan pressure ratio. The gas turbine engine further includes a low pressure (LP) turbine defining a core flowpath therethrough generally along the longitudinal direction. The core flowpath defines a maximum outer flowpath diameter relative to the axial centerline. The gas turbine engine defines a fan to turbine diameter ratio of the maximum fan diameter to the maximum outer flowpath diameter. The fan to turbine diameter ratio over the fan pressure ratio is approximately 0.90 or greater.

17 Claims, 5 Drawing Sheets

(51) Int. Cl.

| | | |
|---|---|---|
| *F02C 7/36* | (2006.01) | |
| *F02C 3/13* | (2006.01) | |
| *F02C 3/107* | (2006.01) | |
| *F02C 7/20* | (2006.01) | |
| *F01D 21/04* | (2006.01) | |
| *B64D 29/02* | (2006.01) | |
| *B64D 27/12* | (2006.01) | |
| *B64D 33/04* | (2006.01) | |

(52) U.S. Cl.
CPC ............... *F02C 3/107* (2013.01); *F02C 3/13* (2013.01); *F02C 7/20* (2013.01); *F02C 7/36* (2013.01); *F02K 3/06* (2013.01); *B64D 33/04* (2013.01); *F05D 2260/40* (2013.01); *F05D 2300/433* (2013.01); *F05D 2300/601* (2013.01); *F05D 2300/6033* (2013.01)

(56) References Cited

U.S. PATENT DOCUMENTS

| | | | |
|---|---|---|---|
| 3,779,006 A * | 12/1973 | Lewis | ............... E04B 1/941 244/54 |
| 3,997,132 A | 12/1976 | Erwin | |
| 4,021,142 A | 5/1977 | Violette | |
| 4,254,619 A | 3/1981 | Giffin, III et al. | |
| 4,596,116 A | 6/1986 | Mandet et al. | |
| 4,827,712 A | 5/1989 | Coplin | |
| 5,577,378 A | 11/1996 | Althaus et al. | |
| 5,627,761 A | 5/1997 | Pollard | |
| 5,921,506 A | 7/1999 | Appa | |
| 6,120,242 A | 9/2000 | Bonnoitt et al. | |
| 6,761,034 B2 | 7/2004 | Niday et al. | |
| 7,096,674 B2 | 8/2006 | Orlando et al. | |
| 7,137,245 B2 | 11/2006 | Graziosi et al. | |
| 7,600,370 B2 | 10/2009 | Dawson | |
| 7,694,505 B2 | 4/2010 | Schilling | |
| 7,770,377 B2 | 8/2010 | Rolt | |
| 7,845,158 B2 | 12/2010 | Udall | |
| 7,971,826 B2 | 7/2011 | Journade et al. | |
| 8,061,649 B2 | 11/2011 | Journade et al. | |
| 8,061,969 B2 | 11/2011 | Durocher et al. | |
| 8,074,440 B2 | 12/2011 | Kohlenberg et al. | |
| 8,336,813 B2 | 12/2012 | Bonnaud et al. | |
| 8,371,812 B2 | 2/2013 | Manteiga et al. | |
| 8,517,666 B2 | 8/2013 | Alvanos et al. | |
| 8,844,265 B2 | 9/2014 | Adams et al. | |
| 8,869,673 B2 * | 10/2014 | Townsend | ............... F41H 5/0421 89/36.01 |
| 8,915,700 B2 | 12/2014 | Kupratis et al. | |
| 8,935,073 B2 | 1/2015 | Hurwitz et al. | |
| 9,032,740 B2 | 5/2015 | Journade et al. | |
| 9,121,347 B2 | 9/2015 | Bellabal et al. | |
| 9,284,887 B2 | 3/2016 | McKenney et al. | |
| 9,346,551 B2 | 5/2016 | Stretton | |
| 9,447,694 B2 | 9/2016 | Sanchez et al. | |
| 9,845,159 B2 | 12/2017 | Suciu et al. | |
| 10,442,559 B2 * | 10/2019 | Dong | ............... B64G 1/10 |
| 2010/0132371 A1 | 6/2010 | Durocher et al. | |
| 2012/0073263 A1 | 3/2012 | Kohlenberg et al. | |
| 2012/0117940 A1 | 5/2012 | Winter | |
| 2012/0205747 A1 | 8/2012 | Yamada et al. | |
| 2013/0062463 A1 | 3/2013 | Lord | |
| 2013/0192196 A1 | 8/2013 | Suciu et al. | |
| 2013/0192263 A1 | 8/2013 | Suciu et al. | |
| 2013/0294908 A1 | 11/2013 | Kuchana et al. | |
| 2014/0283501 A1 | 9/2014 | Schwarz et al. | |
| 2014/0286754 A1 | 9/2014 | Schwarz et al. | |
| 2014/0363270 A1 | 12/2014 | Feldmann et al. | |
| 2015/0089958 A1 | 4/2015 | Suciu et al. | |
| 2015/0096303 A1 | 4/2015 | Schwarz et al. | |
| 2015/0233298 A1 | 8/2015 | Baltas | |
| 2015/0308343 A1 | 10/2015 | Scott et al. | |
| 2015/0345404 A1 | 12/2015 | Adams et al. | |
| 2016/0010589 A1 | 1/2016 | Rolt | |
| 2016/0061052 A1 | 3/2016 | Suciu et al. | |
| 2016/0061057 A1 | 3/2016 | Lord et al. | |
| 2016/0108757 A1 | 4/2016 | Mickelsen et al. | |
| 2016/0108814 A1 | 4/2016 | Schmitz | |
| 2016/0130980 A1 | 5/2016 | McKenney et al. | |
| 2016/0160800 A1 | 6/2016 | Knowles et al. | |
| 2016/0201569 A1 | 7/2016 | Schwarz et al. | |
| 2016/0201570 A1 | 7/2016 | Schwarz et al. | |
| 2016/0201606 A1 * | 7/2016 | Suciu | ............... F02C 3/107 415/68 |
| 2016/0208699 A1 | 7/2016 | Cherolis et al. | |
| 2016/0214727 A1 | 7/2016 | Hamel et al. | |
| 2016/0230604 A1 | 8/2016 | Light et al. | |
| 2016/0238022 A1 | 8/2016 | Heikurinen et al. | |
| 2017/0342904 A1 | 11/2017 | Farah et al. | |

OTHER PUBLICATIONS

John McGrath, Design Considerations for Minimizing Hazards Caused by Uncontained Turbine Engine and Auxiliary Power Unit Rotor Failure [1997], Federal Aviation Administration (Year: 1997).*
Gliebe et al., Ultra-High Bypass Engine Aeroacoustic Study, NASA CR-2003-212525, 2003, 109 Pages.
Gunston, Jane's Aero-Engines, Jane's Information Group Limited, Issue 7, 2000, pp. 23-26.
Gunston, Jane's Aero-Engines, Jane's Information Group Limited, Issue 17, 2005, pp. 610-611.
Kandebo, Geared-Turbofan Engine Design Target Costs, Complexity, 1998 , Aviation Week & Space Technology, vol. 148 Issue 8 start p. 32.
Mattingly et al., Aircraft Engine Design, 2002, American Institute of Aeronautics and Astronautics, 2nd Edition, p. 292.
Mcgrath, Design Considerations for Minimizing Hazards Caused by Uncontained Turbine Engine and Auxiliary Power Unit Rotor Failure, Federal Aviation Administration, AC 20-128A, 1997, 45 Pages.

* cited by examiner

AIRCRAFT AND DIRECT DRIVE ENGINE UNDER WING INSTALLATION

CROSS-REFERENCE TO RELATED APPLICATION

This application is a divisional of U.S. patent application Ser. No. 15/439,167, entitled "AIRCRAFT AND DIRECT DRIVE ENGINE UNDER WING INSTALLATION," filed Feb. 22, 2017, which is hereby incorporated by reference in its entirety.

FIELD

The present subject matter relates generally to gas turbine engine architecture.

BACKGROUND

Aircraft, such as commercial airliners, generally includes gas turbine engines mounted forward of a leading edge of a wing of the aircraft. In known configurations, at least the rotary members of the gas turbine engine (e.g., the turbine section, the compressor section, and the fan assembly) are disposed forward of the leading edge to mitigate risks relative to rotor failure.

Among direct drive gas turbine engines, a low pressure (LP) turbine and the fan assembly are each coupled to a LP shaft to define an LP spool without a reduction gearbox therebetween (i.e. the LP turbine and the fan assembly rotate at approximately the same rotational speed). In contrast, indirect drive gas turbine engines (e.g., geared turbofans) include a reduction gearbox disposed between the fan assembly and the LP turbine rotor. The gearbox generally proportionally reduces the fan assembly speed relative to the LP turbine rotor. Therefore, indirect drive LP turbine rotors generally rotate at greater speeds compared to direct drive LP turbine rotors. For example, some indirect drive LP turbines may rotate approximately three times the speed of a direct drive LP turbine.

However, increased efficiencies due to the faster rotating LP turbine and relatively low speed fan assembly are at least partially offset by increased risks to engines and the aircraft due to rotor failure (e.g., disks, hubs, drums, seals, impellers, blades, and/or spacers). Therefore, known indirect drive LP turbines generally require additional structures to at least reduce such risks to those comparable with the relatively low speed direct drive turbine.

Still further, indirect drive engine architecture introduces additional systems and assemblies (e.g., the reduction gearbox) relative to direct drive engines that generate other performance debits and aircraft risks. For example, in addition to risks from a relatively high speed LP turbine, the reduction gearbox adds weight, complexity, and novel failure modes to the engine and aircraft.

Therefore, there is a need for aircraft and engine systems that may include structural and risk benefits from a relatively low speed LP turbine while also improving aircraft efficiency.

BRIEF DESCRIPTION

Aspects and advantages of the invention will be set forth in part in the following description, or may be obvious from the description, or may be learned through practice of the invention.

The present disclosure is directed to a gas turbine engine defining a radial direction, a longitudinal direction, and a circumferential direction, an upstream end and a downstream end along the longitudinal direction, and an axial centerline extended along the longitudinal direction. The gas turbine engine includes a fan assembly including a plurality of fan blades rotatably coupled to a fan rotor in which the fan blades define a maximum fan diameter and a fan pressure ratio. The gas turbine engine further includes a low pressure (LP) turbine defining a core flowpath therethrough generally along the longitudinal direction. The core flowpath defines a maximum outer flowpath diameter relative to the axial centerline. The gas turbine engine defines a fan to turbine diameter ratio of the maximum fan diameter to the maximum outer flowpath diameter. The fan to turbine diameter ratio over the fan pressure ratio is approximately 0.90 or greater.

In various embodiments, the fan assembly defines a fan pressure ratio between approximately 1.0 and approximately 1.8. In various embodiments, the fan to turbine diameter ratio over the fan pressure ratio is approximately 1.20 or greater at a fan pressure ratio of approximately 1.50 or less. In one embodiment, the fan to turbine diameter ratio over the fan pressure ratio is approximately 1.05 or greater at a fan pressure ratio of between approximately 1.50 to approximately 1.60. In another embodiment, the fan to turbine diameter ratio over the fan pressure ratio is approximately 0.90 or greater at a fan pressure ratio of between approximately 1.60 and approximately 1.80.

In another embodiment, the fan to turbine diameter ratio is approximately 1.8 or greater.

In yet another embodiment, the LP turbine and the fan rotor of the fan assembly are rotatably coupled in direct drive configuration via a driveshaft.

In various embodiments, the LP turbine defines six or more stages of rotors. In one embodiment, the LP turbine defines the maximum outer flowpath diameter at the two or more rotating stages at the downstream-most end of the LP turbine. In another embodiment, the LP turbine defines the maximum outer flowpath diameter at the three or more rotating stages at the downstream-most end of the LP turbine.

In various embodiments, the gas turbine engine further includes a containment shield coupled to an outer casing of the engine extended generally along the longitudinal direction, in which the containment shield extends at least partially along the circumferential direction from the top dead center reference line along the clockwise and/or counter-clockwise direction. In one embodiment, the containment shield extends approximately 60 degrees or less clockwise and/or counter-clockwise from the top dead center reference line along the circumferential direction.

Another aspect of the present disclosure is directed to an aircraft defining a longitudinal direction, a latitudinal direction, and a transverse direction, the aircraft including a fuselage extended along the longitudinal direction to which a pair or more of wings attaches along the transverse direction. The aircraft includes a wing extended from the fuselage and a gas turbine engine. The wing includes a pylon to which the gas turbine engine is coupled. The wing defines a leading edge and a trailing edge, in which the leading edge defines a forward plane extended along a radial direction, and the trailing edge defines an aft plane extended along the radial direction. The engine includes a fan assembly and a low pressure (LP) turbine. The fan assembly includes a plurality of fan blades rotatably coupled to a fan rotor. The fan blades define a maximum fan diameter and a fan pressure ratio. The LP turbine defines a core flowpath therethrough generally along the longitudinal direction. The core flowpath defines a maximum outer flowpath diameter relative to the axial centerline. The gas turbine engine defines a fan to turbine diameter ratio of the maximum fan diameter to the maximum outer flowpath diameter in which the fan to turbine diameter ratio over the fan pressure ratio is approximately 0.90 or greater.

In various embodiments of the aircraft, the LP turbine further defines a first turbine rotor at an upstream-most end of the LP turbine and a last turbine rotor at a downstream-most end of the LP turbine. The LP turbine defines a turbine burst area inward of the wing along the radial direction in which the turbine burst area is extended from the axial centerline at a first angle along a plane of rotation of the first turbine rotor toward the upstream end and at a second angle along a plane of rotation of the last turbine rotor toward the downstream end.

In one embodiment, the first angle of the turbine burst area is approximately 15 degrees or less.

In another embodiment, the second angle of the turbine burst area is approximately 15 degrees or less.

In still another embodiment, the wing defines a wing shear center, and wherein the gas turbine engine further includes an exhaust nozzle disposed downstream of the LP turbine. The exhaust nozzle defines a downstream-most end, in which the downstream-most end is approximately equal to the wing shear center of the wing along the longitudinal direction.

In yet another embodiment, the fan assembly of the gas turbine engine defines a fan pressure ratio between approximately 1.0 and approximately 1.8.

In still another embodiment, the fan to turbine diameter ratio over the fan pressure ratio is approximately 1.20 or greater at a fan pressure ratio of approximately 1.50 or less.

In still yet another embodiment, the fan to turbine diameter ratio of the gas turbine engine is approximately 1.8 or greater.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Figure 1:
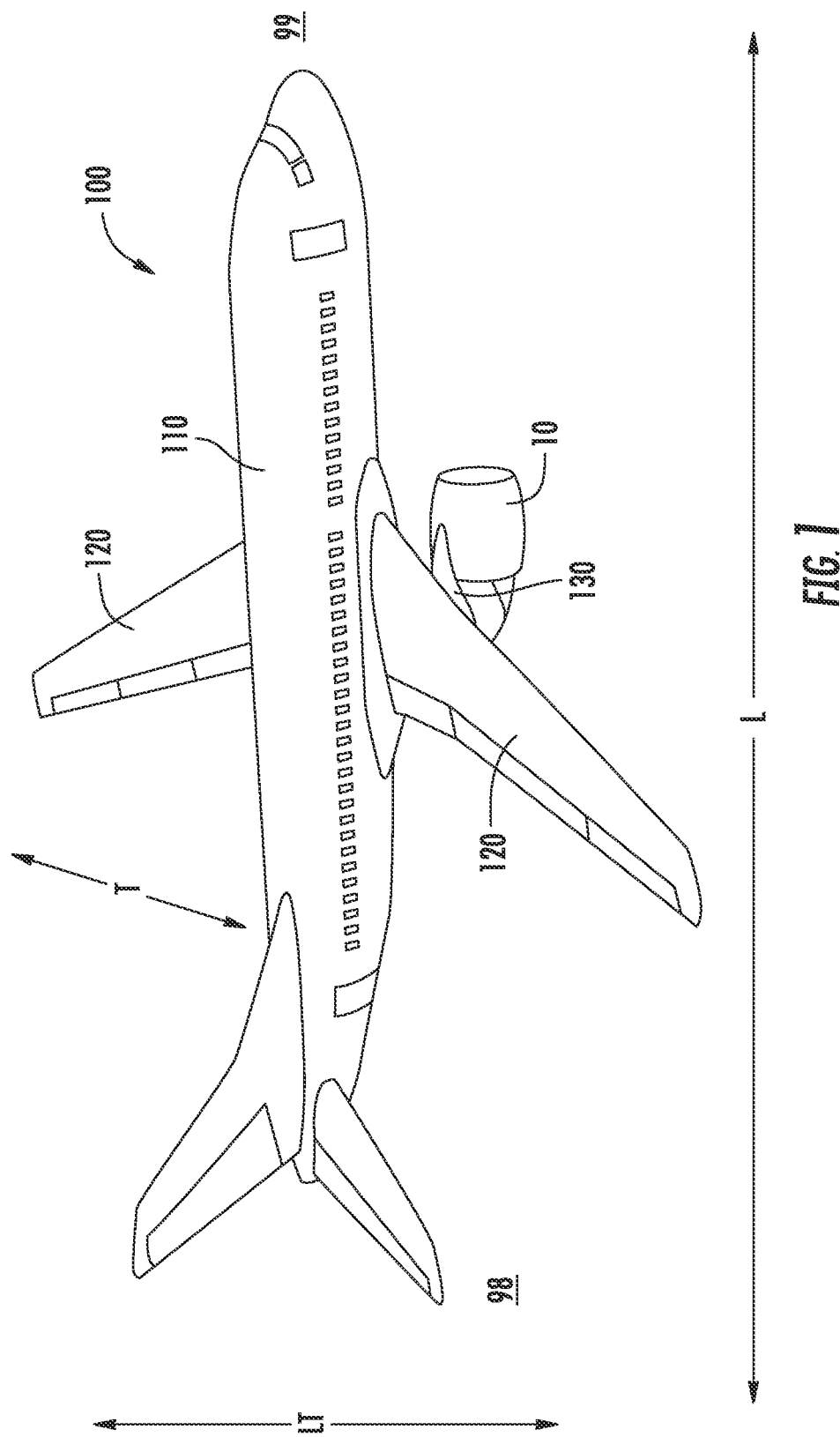
FIG. 1 is a perspective view of an exemplary embodiment of an aircraft including a direct drive engine according to an aspect of the present disclosure.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows. Unless otherwise stated, "downstream" and "upstream" refer to the general direction of fluid flow of air or resulting combustion gases through a core flowpath of the engine from entry in the compressor section through exit from a turbine section.

Embodiments of an engine and aircraft are generally provided including a direct drive gas turbine engine that may include structural and risk benefits from a relatively low speed LP turbine while also improving aircraft efficiency. The engine includes a fan assembly defining a maximum fan diameter and a LP turbine rotor defining a maximum outer flowpath diameter, in which the engine defines a ratio of the maximum fan diameter over the maximum outer flowpath diameter over fan pressure ratio of approximately 0.90 or greater. In various embodiments, the aforementioned engine and ratio may dispose the LP turbine underneath a wing of an aircraft, aft of a leading edge of the wing. In still various embodiments, a containment structure is further provided to mitigate risks to the aircraft associated with turbine rotor burst.

In contrast to indirect drive engine configurations with high speed LP turbines, the embodiments shown and described herein may improve aircraft efficiency without the added systems, complexities, failure modes, or risks of an indirect drive engine. In various embodiments, approximately 318 kilograms (kg) of aircraft weight may be reduced for every 51 millimeter (mm) shift in a center of gravity of the gas turbine engine toward a leading edge of a wing of the aircraft along a longitudinal direction. In still various embodiments, shifting the center of gravity of the gas turbine engine toward the leading edge of the wing may improve aircraft fuel burn by 0.5% for every 51 mm shift. The embodiments described herein may further remove weight, parts, and risks unique to indirect drive engines relative to reduction gearbox failure.

Referring now to FIG. 1, an exemplary embodiment of an aircraft 100 is generally provided. The aircraft 100 defines a longitudinal direction L, a latitudinal direction LT, and a transverse direction T, and an upstream end 99 and a downstream end 98 along the longitudinal direction L. The aircraft 100 includes a fuselage 110 extended generally along the longitudinal direction L. A pair of wings 120 each extend from the fuselage 110 of the aircraft 100. Each wing 120 includes a pylon 130 to which one or more gas turbine engines 10 (hereinafter "engine 10") attaches underneath the wing 120 (e.g., inward along the latitudinal direction LT). In various embodiments as shown and described herein, the exemplary embodiments of the engines 10 define a direct drive engine in which a low pressure turbine rotor attaches to a fan rotor without a reduction gearbox therebetween.

It should be understood that references to "upstream-most end", or "upstream of", are relative to a component or part toward the upstream end 99 as shown in the figures and generally understood in the art as the direction from which a fluid comes before and as it passes the area, part, or component in question. Similarly, references to "downstream-most end" or "downstream of" are relative to a component or part toward the downstream end 98 and is generally understood in the art as the direction to which a fluid goes as it passes the area, part, or component in question.

Figure 2:
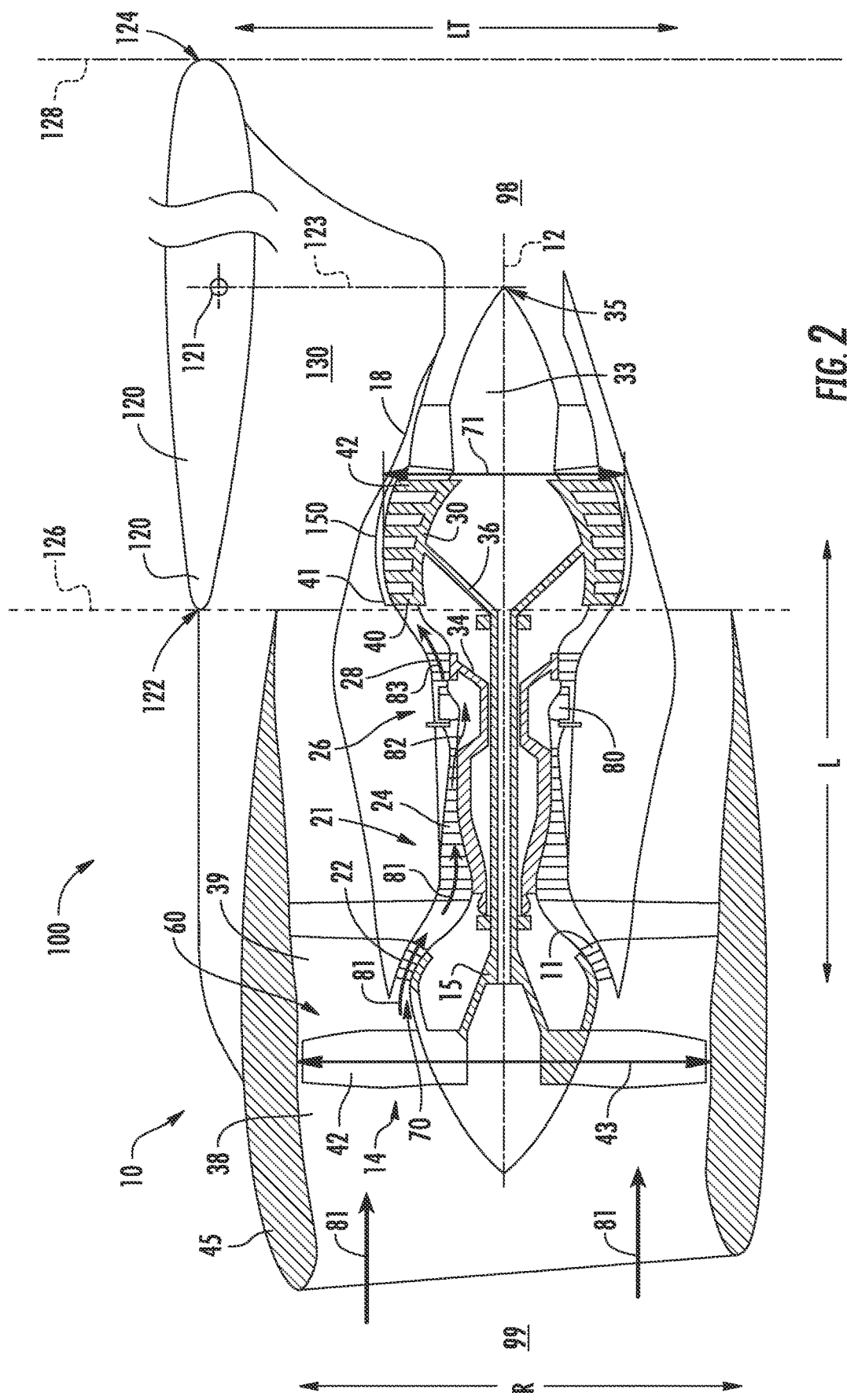
FIG. 2 is a cross sectional view of an exemplary embodiment of a gas turbine engine attached to a wing and pylon of an aircraft.

Referring now to FIG. 2, an exemplary embodiment of a portion of the aircraft 100 is generally provided. FIG. 2 may further provide detail as to the relative placement of the engine 10 to the wing 120 of the aircraft 100 such that overall aircraft efficiency is improved while defining the relative risks, and mitigations thereof, of a direct drive engine. The engine 10 defines an axial centerline 12 extended along the longitudinal direction L, and a radial direction R extended from the axial centerline 12. As shown in FIG. 2, each wing 120 defines a leading edge 122 and a trailing edge 124. As depicted schematically in FIG. 2, the leading edge 122 of the wing 120 defines a forward plane 126 extended along the latitudinal direction LT and the transverse direction T (shown in FIG. 1). The trailing edge 124 of the wing 120 defines an aft plane 128 extended along the latitudinal direction LT and the transverse direction T (shown in FIG. 1).

In various embodiments, the wing 120 further defines a wing shear center 121. The wing shear center 121 defines a point through which shear loads produce no twisting of the wing 120. The wing shear center 121 may further define a center of twist when torsional loads are applied to the wing 120. As depicted schematically in FIG. 1, the wing shear center 121 may further define a wing shear center plane 123 extended along the latitudinal direction LT and the transverse direction T (shown in FIG. 1).

Referring still to FIG. 2, the engine 10 includes, in serial flow arrangement along a longitudinal direction L, a fan assembly 14, a compressor section 21, a combustor section 26, a turbine section 28, 30, and an exhaust nozzle assembly 33. The engine 10 extends generally along the longitudinal direction L, in which the exhaust nozzle assembly 33 defines a downstream-most end 35 that may be disposed approximately equal to the wing shear plane 123 along the longitudinal direction L. In various embodiments, disposing the downstream-most end 34 of the exhaust nozzle assembly 33 may further shift the engine 10, such as at a low pressure (LP) turbine 30, toward the wing shear center 121, and thereby reduce a moment arm from the engine 10 acting from the wing shear center 121. Reducing the moment arm from the wing shear center 121 may further reduce weight of the wing 120 and/or pylon 130, thereby improving aircraft efficiency. In one embodiment, the LP turbine 30 is disposed inward of the wing 120 along latitudinal direction LT. The LP turbine 30 is disposed between the forward plane 126 and the aft plane 128 of the wing 120 along the longitudinal direction L.

The compressor section 21 generally includes a low pressure (LP) compressor 22 and a high pressure (HP) compressor 24 in serial flow arrangement from the upstream end 99 to the downstream end 98. The turbine section generally includes an HP turbine 28 and an LP turbine 30 in serial flow arrangement from the upstream end 99 to the downstream end 98. The combustion section 26 is disposed between the HP compressor 24 and the HP turbine 28. The HP compressor 24 and the HP turbine 28, with an HP shaft 34 rotatably coupling each, together define an HP spool.

The fan assembly 14 includes a plurality of fan blades 42 rotatably coupled to a fan rotor 15. The fan rotor 15 is rotatably coupled toward the upstream end 99 of a driveshaft 36 extended along the longitudinal direction L. The LP turbine 30 is coupled to the driveshaft 36 toward the downstream end 98 of the driveshaft 36. The fan assembly 14, LP compressor 22, driveshaft 36, and the LP turbine 30 together define an LP spool. In one embodiment, the LP turbine 30 defines at least four rotating stages or rotors 40. In another embodiment, the LP turbine 30 defines six or more rotating stages 40.

During operation of the engine 10, a drive motor begins rotation of the HP spool, which introduces air, shown schematically as arrows 81, into a core flowpath 70 of the engine 10. The air 81 passes across successive stages of the LP compressor 22 and the HP compressor 24 and increases in pressure to define compressed air 82 entering the combustion section 26. Fuel is introduced to the combustion section 26 and mixed with the compressed air 82 then ignited to yield combustion gases 83. Energy from the combustion gases 83 drives rotation of the HP turbine 28 and the LP turbine 30, as well as their respective HP and LP spools, and the fan assembly 14 and compressor section 21 to which each are attached. In one embodiment, the LP spool rotates about the axial centerline 12 at approximately 6000 revolutions per minute (RPM) or less. In another embodiment, the LP spool rotates about the axial centerline 12 at approximately 4000 RPM or less.

The cycle of introducing air 81 into the core flowpath 70, mixing with fuel, igniting, and producing combustion gases 83 provides energy to rotate the plurality of fan blades 42 about an axial centerline 12 of the engine 10. A portion of air 81 passes through a bypass duct 60 defined between a nacelle 45 and an outer casing 18 of the engine 10. The outer casing 18 is substantially tubular and surrounding the compressor section 21, the combustion section 26, and the turbine section 28, 30 generally along the longitudinal direction L. In the embodiment described herein, the nacelle 45 may further include a fan case. The outer casing 18 may further include a cowl defining a generally aerodynamic flowpath of the bypass duct 60.

Referring still to FIG. 2, the fan blades 42 define a maximum fan diameter 43 along the radial direction R. The maximum fan diameter 43 is generally from tip to tip of diametrically opposed fan blades 42. Alternatively, the maximum fan diameter 43 may refer to an inner diameter of the nacelle 45 including a fan case surrounding the fan blades 42. The fan assembly 14 of the engine 10 further defines a fan pressure ratio measured generally from downstream of the fan blades 42 over the upstream of the fan blades 42 (i.e., a ratio of fan discharge pressure to fan inlet pressure). For example, the fan pressure ratio may be a ratio of the pressure downstream of the fan blades 42 shown schematically at point 39 over the pressure upstream of the fan blades 42 shown schematically at point 38. In various embodiments, the engine 10 defines a fan pressure ratio between approximately 1.0 and approximately 1.8.

Figure 3:
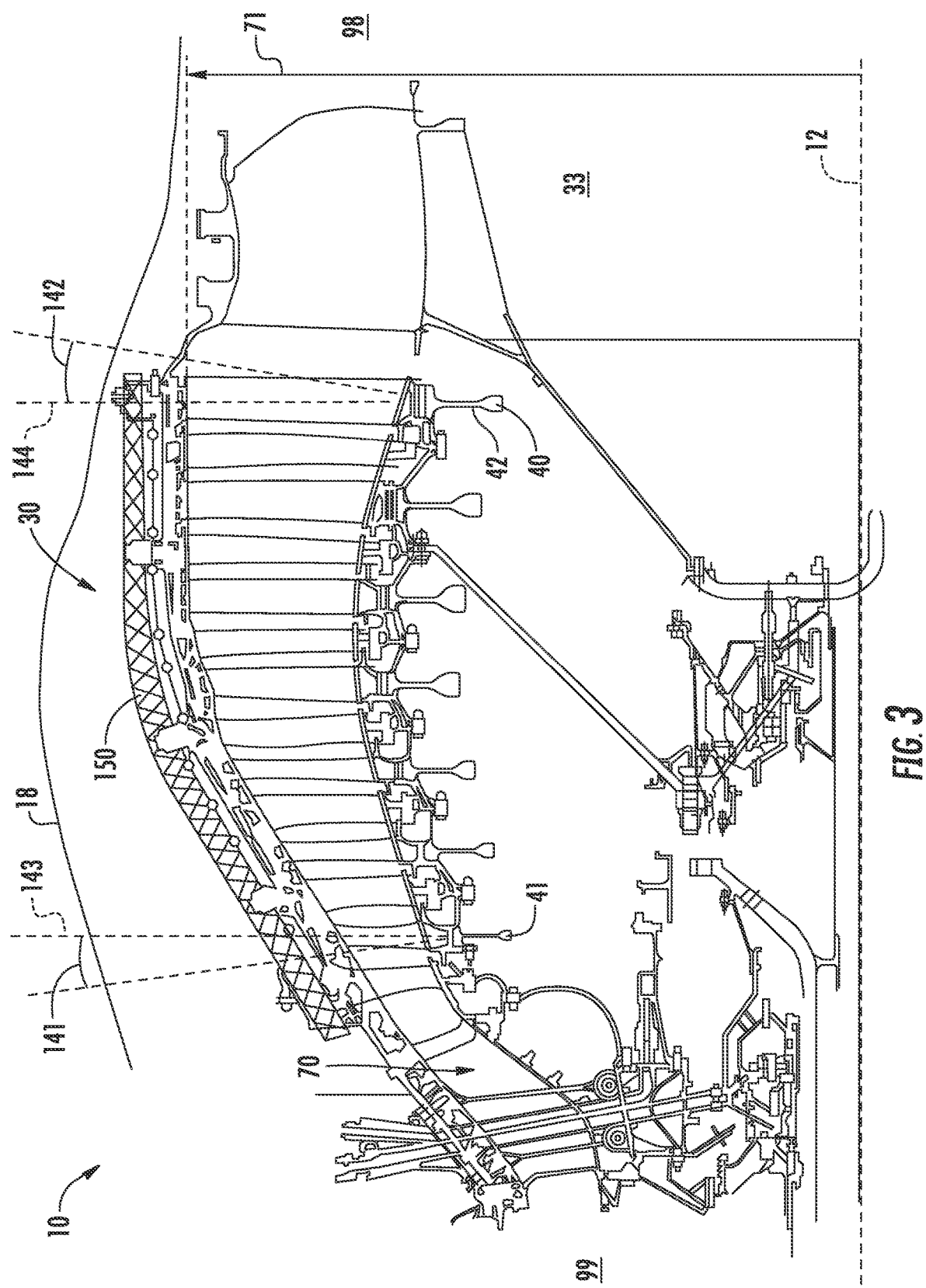
FIG. 3 is a cross sectional view of an exemplary embodiment of the LP turbine of the engine shown in FIGS. 1-2.

Referring now to FIG. 3, an exemplary embodiment of the LP turbine 30 of the engine 10 is generally provided. Referring to FIGS. 1-3, the LP turbine 30 of the engine 10 further defines the core flowpath 70 therethrough generally along the longitudinal direction L. The core flowpath 70 defines within the LP turbine 30 a maximum outer flowpath diameter 71 relative to the axial centerline 12. The engine 10 further defines a fan to turbine diameter ratio, in which the fan to turbine diameter ratio is the maximum fan diameter 43 over the maximum outer flowpath diameter 71.

$$\text{fan to turbine diameter ratio} = \frac{\text{maximum fan diameter}}{\text{maximum outer flowpath diameter}}$$

The engine 10 further defines a fan to turbine diameter ratio over the fan pressure ratio of approximately 0.90 or greater.

$$\frac{\text{fan to turbine diameter ratio}}{\text{fan pressure ratio}} \geq 0.90$$

In various embodiments, the fan to turbine diameter ratio over the fan pressure ratio is approximately 1.20 or greater at a fan pressure ratio of approximately 1.50 or less. In one embodiment, the fan to turbine diameter ratio over the fan pressure ratio is approximately 1.05 or greater at a fan pressure ratio of between approximately 1.50 to approximately 1.60. In another embodiment, the fan to turbine diameter ratio over the fan pressure ratio is approximately 0.90 or greater at a fan pressure ratio of between approximately 1.60 and approximately 1.80. In various embodiments, the fan to turbine diameter ratio is approximately 1.8 or greater.

Referring still to FIGS. 1-3, the LP turbine 30 defines a plurality of rotating stages or rotors 40 disposed along the longitudinal direction L. In one embodiment, the LP turbine 30 defines the maximum outer flowpath diameter 71 at the two or more rotating stages 40 at the downstream-most end of the LP turbine (i.e., the last two rotors of the LP turbine 30). In another embodiment, the LP turbine 30 defines the maximum outer flowpath diameter 71 at the three or more rotating stages 40 at the downstream-most end of the LP turbine 30.

Figure 4:
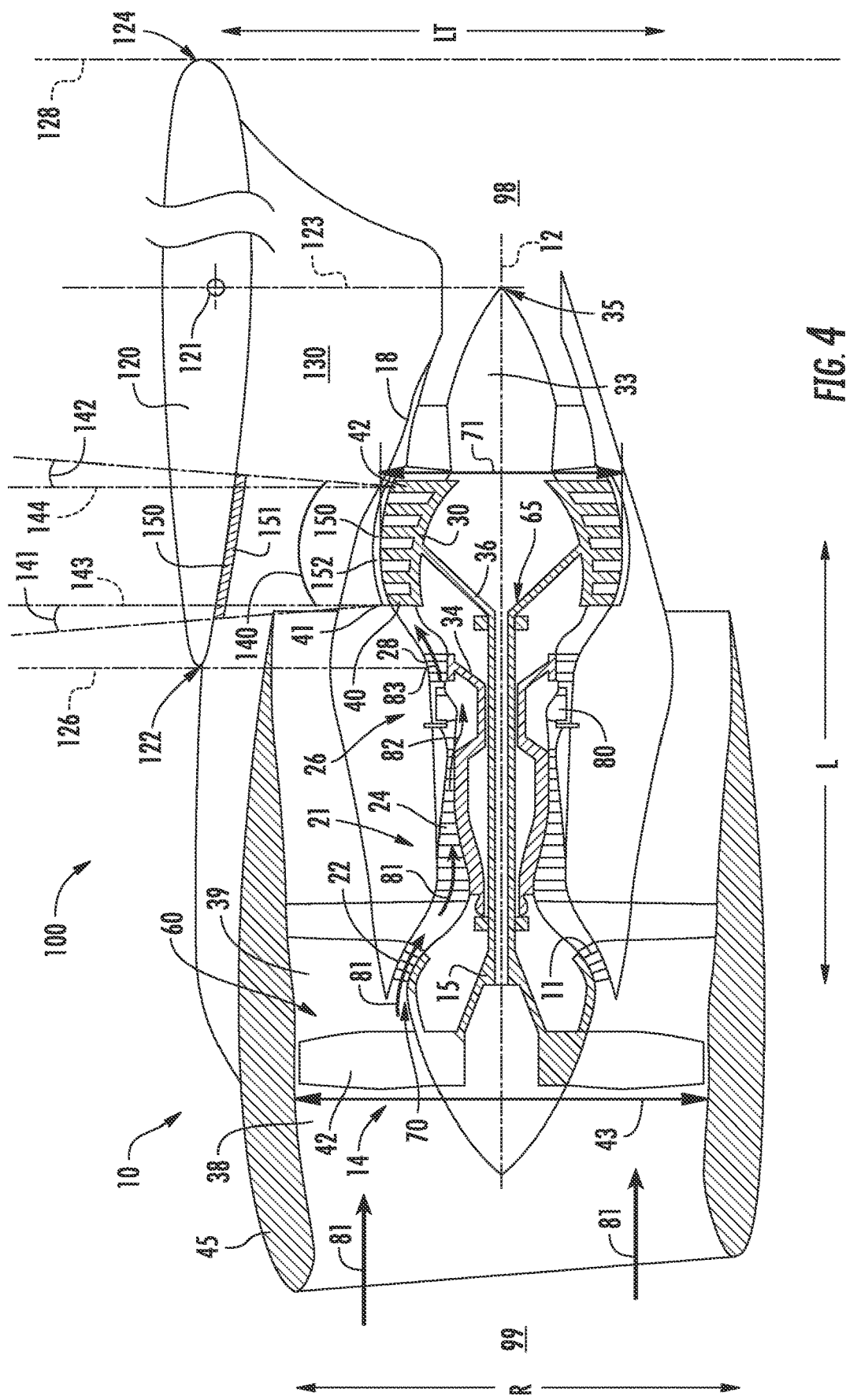
FIG. 4 is a cross sectional view of another exemplary embodiment of a gas turbine engine attached to a wing and pylon of an aircraft.

Referring now to FIG. 4, another exemplary embodiment of the portion of the aircraft 100 shown in FIGS. 1-3 is generally provided. In the embodiment shown in FIG. 4, and in conjunction with FIGS. 1-3, the LP turbine 30 of the engine 10 defines a first turbine rotor 41 at an upstream-most end of the LP turbine 30 and a last turbine rotor 42 at a downstream-most end of the LP turbine 30. The LP turbine 30 defines a turbine burst area 140 extended at a first angle 141 along a plane of rotation 143 of the first turbine rotor 41 toward the upstream end 99 of the gas turbine engine 10, and at a second angle 142 along a plane of rotation 144 of the last turbine rotor 42 toward the downstream end 98 of the gas turbine engine 10. Each plane of rotation 143, 144 extends along the radial direction R. Each plane of rotation 143, 144 may further extend along the transverse direction T (shown in FIG. 1).

Referring to FIG. 4, in one embodiment, the first angle 141 of the turbine burst area 140 is approximately 15 degrees or less. In another embodiment, the first angle 141 of the turbine burst area 140 is approximately 5 degrees or more.

Referring still to FIG. 4, in one embodiment, the second angle 142 of the turbine burst area 140 is approximately 15 degrees or less. In another embodiment, the second angle 142 of the turbine burst area 140 is approximately 5 degrees or more.

Referring now to FIGS. 1-4, in various embodiments, the turbine burst area 140 inward of the wing 120 along the latitudinal direction LT is defined within the forward plane 126 and within the aft plane 128 of the wing 120 along the longitudinal direction L.

Defining the turbine burst area 140 inward of the wing 120 along the latitudinal direction LT, and between the forward plane 126 and the aft plane 128 along the longitudinal direction L, may reduce pylon 130 and wing 120 weight by shifting the engine 10 toward the wing shear center 121 along the longitudinal direction L. Shifting the engine 10 toward the wing shear center 121 may reduce aircraft 100 weight and thereby increase aircraft efficiency. While further defining a direct drive engine, the overhung weight from the pylon 130 and the engine 10 may be reduced due to an absence of a reduction gearbox toward the upstream end 99 of the engine 10, thereby increasing the moment arm from the wing shear center 121, and ultimately, aircraft weight and inefficiency. By disposing the turbine burst area 140 within the forward plane 126 and the aft plane 128 of the wing 120, the weight of the pylon 130 and wing 120 are reduced while also maintaining risks and failure modes similar to and known among direct drive engines.

Figure 5:
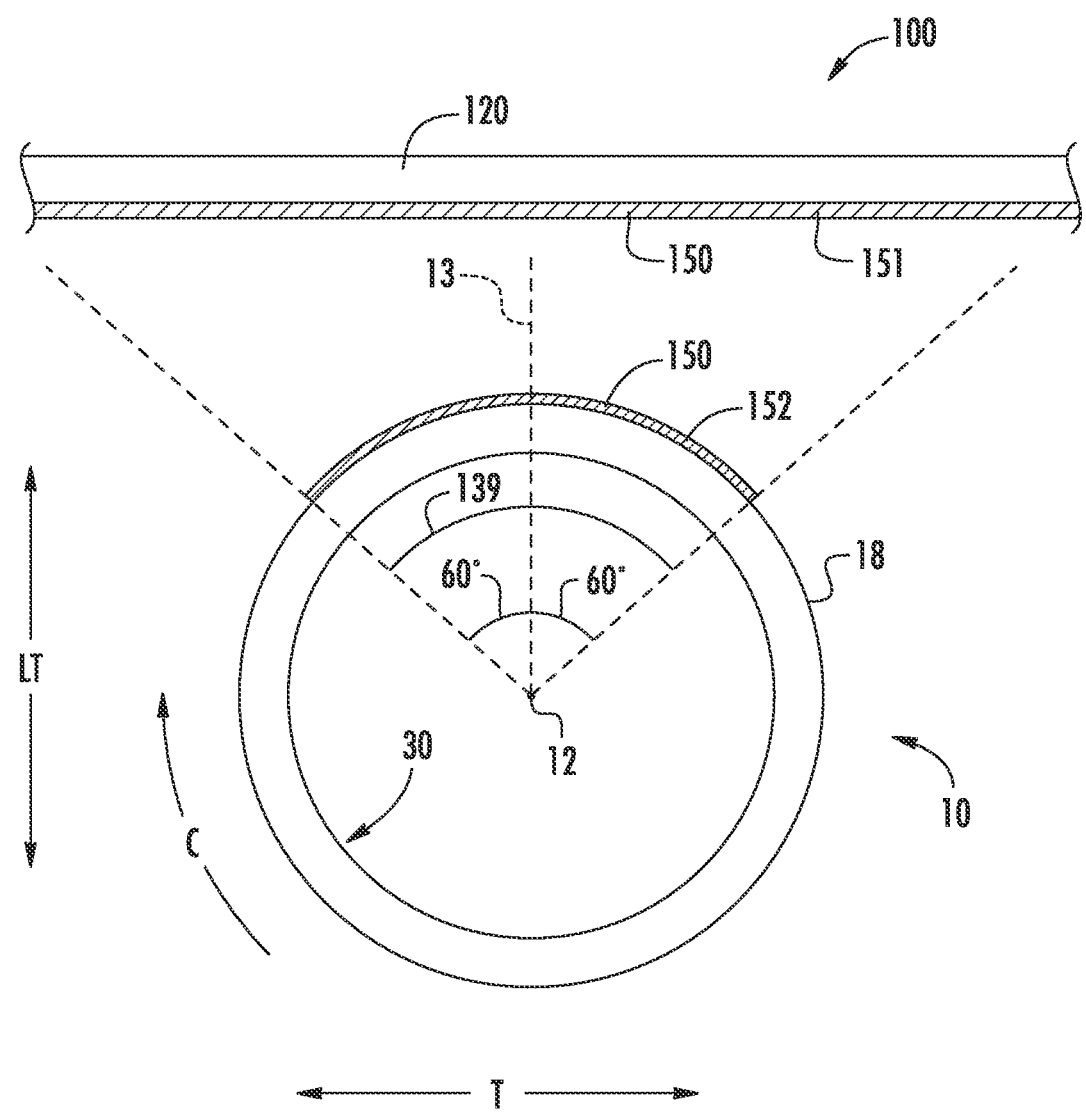
FIG. 5 is a planar view of an exemplary embodiment of the aircraft shown in FIGS. 1-4.

Referring now to FIGS. 1-5, embodiments of the aircraft 100 and engine 10 are generally provided, in which a containment shield 150 is further defined. In FIG. 5, a planar view of the aircraft 100 is provided along either plane of rotation 143, 144. The containment shield 150 is extended over the LP turbine 30 along the longitudinal direction L. In various embodiments, the containment shield 150 extends from the first turbine rotor 41 through the last turbine rotor 42 along the longitudinal direction L. The containment shield 150 provides retention of LP turbine 30 rotor components that may liberate following a rotor failure. Rotor components may include disks, hubs, drums, seals, impellers, blades, and/or spacers, or fragments thereof, which may eject from the engine 10 generally within the turbine burst area 140.

In various embodiments, the containment shield 150 extends at least within a transverse turbine burst area 139. The transverse turbine burst area 139 may generally extend clockwise and/or counter-clockwise from a top dead center reference line 13. The top dead center reference line 13 is extended from the axial centerline 12 along the radial direction R. In one embodiment, the transverse turbine burst area 139 extends approximately 60 degrees or less clockwise and/or counter-clockwise from the top dead center reference line 13.

In one embodiment, the containment shield 150 may be coupled to the wing 120 of the aircraft 100, as shown at the first containment shield 151. The first containment shield 151 extends generally along the transverse direction T and within the transverse turbine burst area 139. In another embodiment, the containment shield 150 may be coupled to the outer casing 18 of the engine 10, as shown at the second containment shield 152. The second containment shield 152 extends at least partially in a circumferential direction C from the top dead center reference line 13 extended from the axial centerline 12 of the engine 10. In various embodiments, the second containment shield 152 extends along the clockwise and/or counter-clockwise direction along the circumferential direction C from the top dead center reference line 13. In yet another embodiment, the second containment shield 152 may extend substantially circumferentially around the LP turbine 30 along the circumferential direction C (e.g., approximately 360 degrees).

The containment shield 150 may be constructed of, but not limited to, ceramic matrix composite (CMC) materials and/or metals appropriate for gas turbine engine containment structures, such as, but not limited to, nickel-based alloys, cobalt-based alloys, iron-based alloys, or titanium-based alloys, each of which may include, but are not limited to, chromium, cobalt, tungsten, tantalum, molybdenum, and/or rhenium.

The containment shield 150 may further, or alternatively, include a solid foamed synthetic polymer. In one embodiment, the solid foamed synthetic polymer may include a synthetic elastomer, such as an elastomeric polyurethane. In another embodiment, the solid foamed synthetic polymer may include an ethylene vinyl acetate and/or an olefin polymer.

In another embodiment, the containment shield 150 is formed from a plurality of fabric sheets formed from a plurality of fibers. In each sheet, the plurality of fibers may form a network of fibers (e.g., a woven network, a random or parallel nonwoven network, or another orientation). In particular, the containment shield 150 may be constructed from high strength and high modulus fibers, such as para-aramid synthetic fibers (e.g., KEVLAR fibers available from E.I. duPont de Nemours and Company), metal fibers, ceramic fibers, glass fibers, carbon fibers, boron fibers, p-phenylenetherephtalamide fibers, aromatic polyamide fibers, silicon carbide fibers, graphite fibers, nylon fibers, or mixtures thereof. Another example of suitable fibers includes ultra-high molecular weight polyethylene (e.g., SPECTRA fibers manufactured by Honeywell International Inc.).

The fibers of the containment shield 150 may have high tensile strength and high modulus that are highly oriented, thereby resulting in very smooth fiber surfaces exhibiting a low coefficient of friction. Such fibers, when formed into a fabric layer, generally exhibit poor energy transfer to neighboring fibers during intermittent transfers of energy or torque from rotor failure of the LP turbine 30 to surrounding structures, such as the outer casing 18 and/or the wing 120 of the aircraft 100.

The systems shown in FIGS. 1-5 and described herein may improve aircraft efficiency utilizing direct drive gas turbine engines by reducing a moment arm from the wing shear center 121 to the upstream end 99 of the engine 10, thereby reducing weight of the wing 120, pylon 130, and/or engine 10. Reducing the moment arm may be enabled by defining the maximum outer flowpath diameter 71 of the LP turbine 30 in relation to the maximum fan diameter 43. Still further, reducing the moment art may be enabled by defining the maximum outer flowpath diameter 71 at the two or more rotating stages 40 at the downstream-most end of the LP turbine 30 (e.g., the two or more stages from the downstream end 98 of the engine 10). Furthermore, the systems disclosed herein may improve aircraft 100 efficiency while utilizing direct drive gas turbine engines while obviating additional subsystems, risks, and failure modes introduced by indirect drive engines. Improvements to aircraft efficiency may include decreased weight, decreased system failure risks, and improved overall aircraft fuel burn.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A direct drive gas turbine engine mounted to an aircraft wing having a leading edge and a trailing edge, the direct drive gas turbine engine defining a radial direction, a longitudinal direction, and a circumferential direction, an upstream end and a downstream end along the longitudinal direction, and an axial centerline extended along the longitudinal direction, the gas turbine engine comprising:
    a fan assembly comprising a plurality of fan blades rotatably coupled to a fan rotor, the fan blades defining a maximum fan diameter and a fan pressure ratio; and
    a low pressure (LP) turbine defining a core flowpath therethrough generally along the longitudinal direction, wherein the core flowpath defines a maximum outer flowpath diameter relative to the axial centerline, wherein the maximum outer flowpath diameter is defined at two or more rotating stages at a downstream-most end of the LP turbine, and wherein the gas turbine engine defines a fan to turbine diameter ratio of the maximum fan diameter to the maximum outer flowpath diameter less than or equal to 1.8, and wherein the fan to turbine diameter ratio over the fan pressure ratio is 0.90 or greater,
    wherein a containment shield extends over the LP turbine from a first turbine rotor through a last turbine rotor along the longitudinal direction between the leading edge and the trailing edge of the aircraft wing,
    wherein the containment shield is coupled to an outer casing of the engine extended generally along the longitudinal direction, wherein the containment shield extends at least partially along the circumferential direction from a top dead center reference line along the circumferential direction, and
    wherein the containment shield extends 60 degrees or less from the top dead center reference line along the circumferential direction.

2. The gas turbine engine mounted to the aircraft wing of claim 1, wherein the fan pressure ratio defined by the fan assembly is between 1.0 and 1.8.

3. The gas turbine engine mounted to the aircraft wing of claim 2, wherein the fan to turbine diameter ratio over the fan pressure ratio is 1.20 or greater at the fan pressure ratio of 1.50 or less.

4. The gas turbine engine mounted to the aircraft wing of claim 2, wherein the fan to turbine diameter ratio over the fan pressure ratio is 1.05 or greater at the fan pressure ratio of between 1.50 to 1.60.

5. The gas turbine engine mounted to the aircraft wing of claim 1, wherein the fan to turbine diameter ratio is 1.44 to 1.8.

6. The gas turbine engine mounted to the aircraft wing of claim 1, wherein the LP turbine and the fan rotor of the fan assembly are rotatably coupled in direct drive configuration via a driveshaft.

7. The gas turbine engine mounted to the aircraft wing of claim 1, wherein the LP turbine defines six or more stages of rotors.

8. The gas turbine engine mounted to the aircraft wing of claim 1, wherein the LP turbine defines the maximum outer flowpath diameter at three or more rotating stages at the downstream-most end of the LP turbine.

9. The gas turbine engine mounted to the aircraft wing of claim 1, wherein the LP turbine further defines a first turbine rotor at an upstream-most end of the LP turbine and a last turbine rotor at the downstream-most end of the LP turbine, and further wherein the LP turbine defines a turbine burst area inward of the aircraft wing along a latitudinal direction, the turbine burst area extended from the axial centerline at a first angle along a plane of rotation of the first turbine rotor toward the upstream-most end, and at a second angle along a plane of rotation of the last turbine rotor toward the downstream-most end.

10. The gas turbine engine mounted to the aircraft wing of claim 9, wherein the first angle of the turbine burst area is 15 degrees or less.

11. The gas turbine engine mounted to the aircraft wing of claim 9, wherein the second angle of the turbine burst area is 15 degrees or less.

12. The gas turbine engine mounted to the aircraft wing of claim 1, wherein the containment shield comprises:
   a first containment shield extending at least along a transverse direction; and
   a second containment shield extending at least along a circumferential direction.

13. The gas turbine engine mounted to the aircraft wing of claim 12, wherein the second containment shield extends clockwise and counter-clockwise from the top dead center reference line.

14. The gas turbine engine mounted to the aircraft wing of claim 12, wherein the first containment shield is spaced apart from the second containment shield.

15. The gas turbine engine mounted to the aircraft wing of claim 1, wherein the containment shield comprises a ceramic matrix composite material.

16. The gas turbine engine mounted to the aircraft wing of claim 1, wherein the containment shield extends clockwise and counter-clockwise from the top dead center reference line.

17. The gas turbine engine mounted to the aircraft wing of claim 1, wherein the containment shield comprises a solid foamed synthetic polymer.

* * * * *